UNITED STATES PATENT OFFICE.

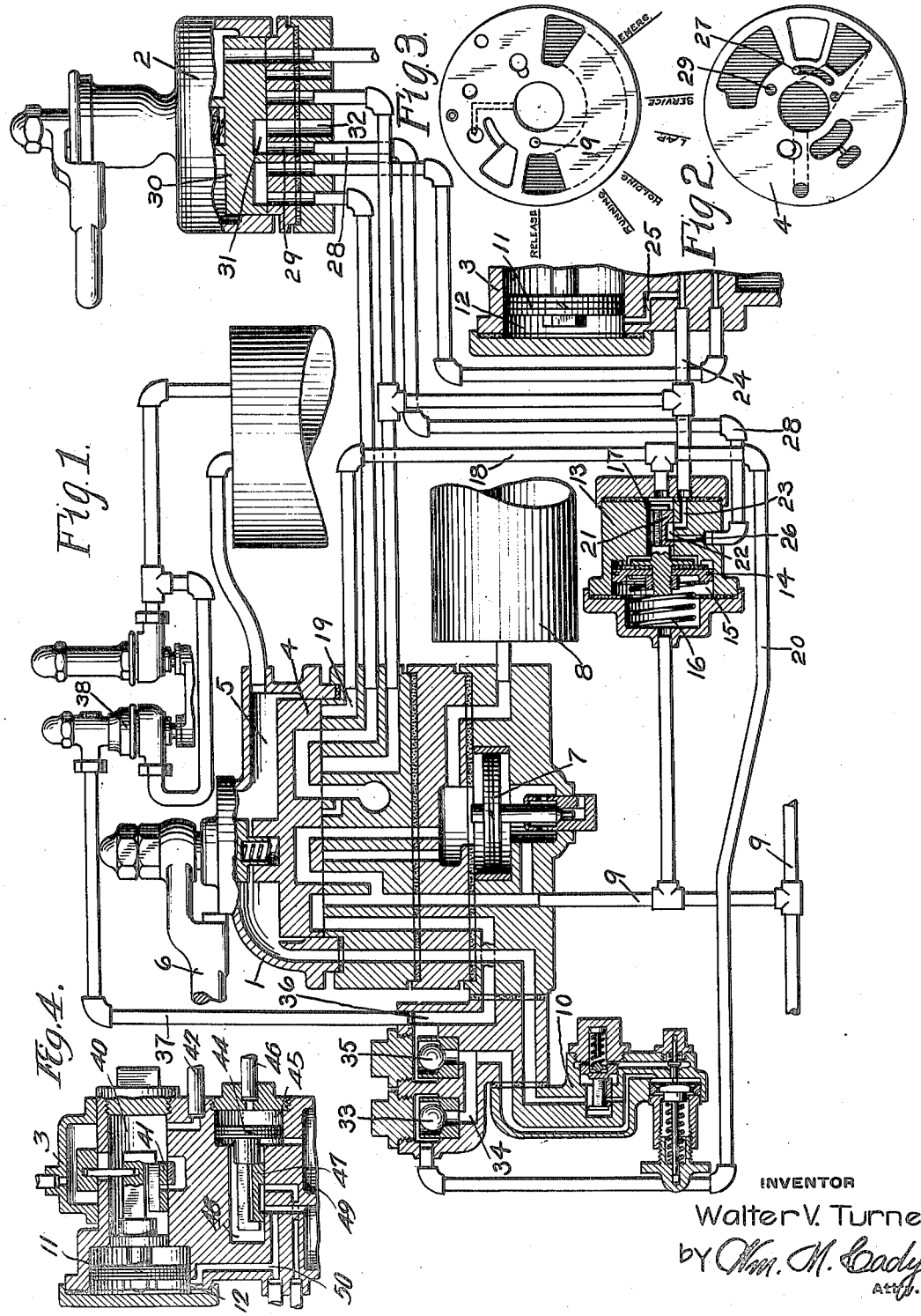

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-APPLICATION-RETARDING VALVE.

1,294,973.  Specification of Letters Patent.  Patented Feb. 18, 1919.

Application filed July 25, 1916. Serial No. 111,164.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Application-Retarding Valves, of which the following is a specification.

This invention relates to fluid pressure brakes, and more particularly to a brake equipment for controlling the brakes on railway trains.

When a very light application of the brakes is made, the reduction in brake pipe pressure may be so slight as to render it difficult to obtain a sufficient increase in brake pipe pressure to effect the release of the brakes.

Such an application of the brakes may be obtained intentionally, or by the surging of fluid pressure in the brake pipe when the brake valve is moved back and forth between running and release positions, or by reason of fluctuations in brake pipe pressure caused by a feed valve in poor condition.

The principal object of my invention is to provide means for preventing an application of the brakes unless the brake pipe pressure is reduced to a predetermined degree, such that the brakes may be readily released.

In the accompanying drawings; Figure 1 is a diagrammatic view of an engine brake equipment embodying my invention; Fig. 2 a face view of the rotary valve of the engineer's brake valve; Fig. 3 a plan view of the rotary valve seat, and Fig. 4 a sectional view of the distributing valve.

As shown in the drawing, the brake equipment may comprise an engineer's brake valve 1, an independent brake valve 2, and a distributing valve device 3.

The engineer's brake valve 1 may comprise a rotary valve 4 contained in valve chamber 5 and adapted to be operated by a handle 6. The brake valve is provided with the usual equalizing discharge valve device 7 connected to equalizing reservoir 8 for controlling the discharge of fluid under pressure from the brake pipe 9, and a feed valve device 10 is attached to the brake valve for controlling the supply of fluid to the brake pipe.

The distributing valve device 3 is provided with the usual application piston 11 subject on one side to the pressure of an application chamber 12 and on the opposite side to brake cylinder pressure for controlling the application and release of the brakes.

The valve chamber 40 at the opposite side of piston 11 contains a release valve 41 and is connected to pipe 42 leading to the brake cylinder and this valve, as well as the supply valve 43, is adapted to be operated by piston 11.

For varying the fluid pressure in chamber 12 an equalizing valve device is provided, comprising a piston 44, contained in piston chamber 45, which is connected to brake pipe 46, and a valve 47, contained in valve chamber 48 which is connected to pressure chamber 49.

The movement of valve 47 controls the admission and release of fluid pressure, through passage 50, to and from the chamber 12.

According to my invention, a valve device 13 is provided for controlling the release of fluid from the application chamber 12 under certain conditions, so that fluid pressure cannot be built up therein to effect an application of the brakes.

The valve device 13 may comprise a piston 14 subject on one side to the fluid pressure in chamber 15 and the pressure of a coil spring 16 and on the opposite side to the fluid pressure in valve chamber 17 which is connected to a pipe 18 leading to a port 19 controlled by the rotary valve 4. A branch pipe 20 leads from pipe 18 to the feed valve device 10 and piston chamber 15 is connected to the brake pipe 9.

Within the valve chamber 17 is mounted a slide valve 21 adapted to be operated by piston 14 and having a cavity 22 adapted in one position of the slide valve to connect a passage 23 and pipe 24 leading to application chamber passage 25 with an exhaust port 26.

In operation, the feed valve device 10 supplies fluid at standard brake pipe pressure through pipe 20 to valve chamber 17 of the valve device 13, while brake pipe pressure is supplied to piston chamber 15.

Normally, the pressure of fluid supplied by the feed valve corresponds with the brake pipe pressure, so that the fluid pressures on opposite sides of piston 14 are equal and the spring 16 maintains the piston 14 in the position shown in the drawing, so that the valve 21 connects the passage 23 with exhaust port 26 through cavity 22.

If fluid under pressure should be supplied to the application chamber 12 by operation of the usual equalizing valve device of the distributing valve, with the valve device 13 in the above position, the same will be discharged to the atmosphere, so that no application of the brakes will occur.

If, however, the brake pipe pressure is reduced to a predetermined degree less than the feed valve pressure, then the higher fluid pressure in valve chamber 17 will overcome the pressure of spring 16 and the piston 14 will operate the valve 21 to cut off passage 23 from exhaust port 26, so that fluid supplied to the application chamber 12 will be retained in the usual manner and thus a brake application will be obtained.

In the release position of the brake valve 1, a through port 27 in the rotary valve registers with passage 19, so that fluid at main reservoir pressure is supplied to valve chamber 17. This operates to shift the piston 14 so as to cause the valve 21 to blank passage 23, in order that application chamber pressure may be retained in this position and the usual operation of the equipment secured.

In a similar manner, a through port 28 registers with passage 19 in the holding position of the brake valve, so application chamber pressure will not be released in this position, as otherwise the brakes could not be held applied as desired.

In other positions of the brake valve, the passage 19 is blanked, so that the valve device 13 operates as hereinbefore described to prevent an application of the brakes under slight reductions in brake pipe pressure.

As the operation of the valve device 13 would interfere with obtaining a straight air application of the brakes upon manipulation of the independent brake valve 2, since normally said valve device provides an open exhaust port to the application chamber, I preferably connect the exhaust port 26 by a pipe 28 to a port 29 leading to the seat of the rotary valve 30 of the independent brake valve.

In the normal running position of the independent brake valve, a cavity 31 in the rotary valve connects port 29 with an exhaust port 32, so that the valve device 13 can perform its function as hereinbefore described. If, however, the independent brake valve is manipulated to effect a straight air application of the brakes, the port 29 is blanked, so that fluid supplied to the application chamber of the distributing valve device in effecting a straight air application of the brakes is retained therein.

A check valve 33 is interposed in the passage 34 leading from feed valve device 10 to pipe 20, so that when fluid at main reservoir pressure is supplied to the valve chamber 17 of the valve device 13, the same cannot flow back to the feed valve.

A check valve 35 is also interposed in the passage 36 leading to the brake valve 1, so that when the brake valve is turned to a position in which fluid at main reservoir pressure is supplied through pipe 37 to the excess pressure head of the pump governor 38, this pressure cannot flow back to the valve chamber 17 of the valve device 13.

It will be noted that the ports and passages of the brake valve device 1 are shown diagrammatically in Fig. 1, and not as they are actually arranged. The actual arrangement of ports and passages being shown in Figs. 2 and 3 of the drawings.

Having now described my invention what I claim as new and desire to secure by Letters Patent is:—

1. In a fluid pressure brake, the combination with a brake pipe and a valve device having an application chamber, a variation in pressure in which is adapted to effect an application of the brakes, and a valve device subject to brake pipe pressure for controlling the exhaust from said application chamber; of additional means governed by the brake pipe pressure for controlling an exhaust from the application chamber.

2. In a fluid pressure brake, the combination with a brake pipe, a valve device having an application chamber, an increase in pressure in which is adapted to effect an application of the brakes, and an equalizing valve device subject to brake pipe pressure for controlling the exhaust from said application chamber; of an additional valve device operated by a predetermined reduction in brake pipe pressure for closing an exhaust from the application chamber.

3. In a fluid pressure brake, the combination with a brake pipe, a valve device having an application chamber, an increase in pressure in which is adapted to effect an application of the brakes, and an equalizing valve device subject to brake pipe pressure for controlling the exhaust from said application chamber; of an auxiliary valve device normally maintaining an open exhaust to the application chamber and operated upon a predetermined reduction in brake pipe pressure for closing said exhaust.

4. In a fluid pressure brake, the combination with a brake pipe, a feed valve device for maintaining the standard pressure in the brake pipe, and a valve device having an application chamber for controlling the application of the brakes, of a valve device subject to the opposing pressures of the brake pipe and the feed valve device and operated upon a predetermined reduction in brake pipe pressure for closing an exhaust from the application chamber.

5. In a fluid pressure brake, the combination with a brake pipe, a valve device having an application chamber for controlling the application of the brakes, a main reservoir, and a brake valve, of a valve device for controlling an exhaust from the application chamber and operated by main reservoir pressure supplied in one position of the brake valve for closing said exhaust.

6. In a fluid pressure brake, the combination with a brake pipe, a valve device having an application chamber for controlling the application of the brakes, a main reservoir, and a brake valve having a release position, of a valve device normally operating according to the brake pipe pressure for controlling an exhaust from the application chamber and adapted to be operated by main reservoir pressure upon movement of the brake valve device to release position for closing said exhaust.

7. In a fluid pressure brake, the combination with a brake pipe, a valve device having an application chamber for controlling the application of the brakes, a main reservoir, and a brake valve having a release and a holding position, of a valve device for controlling an exhaust from the application chamber and operated by main reservoir pressure supplied upon movement of the brake valve to either release or holding position for closing said exhaust.

8. In a fluid pressure brake, the combination with a brake valve device, a brake pipe, and a feed valve device for supplying fluid to the brake pipe, of a distributing valve device having an application chamber for controlling the application of the brakes, a valve device subject to the opposing pressures of the brake pipe and the feed valve device for controlling an exhaust from the application chamber, and a check valve for preventing back flow from the exhaust controlling valve device to the feed valve.

9. In a fluid pressure brake, the combination with a brake valve device, a brake pipe, and a feed valve device for supplying fluid to the brake pipe, of a distributing valve device having an application chamber for controlling the application of the brakes, a valve device subject to the opposing pressures of the brake pipe and the feed valve device for controlling an exhaust from the application chamber, and a check valve for preventing back flow from the brake valve to the feed valve device.

10. In a fluid pressure brake, the combination with a brake pipe, a feed valve device for maintaining the brake pipe at the standard pressure, and a distributing valve device having an application chamber for controlling the application of the brakes, of a valve for controlling an exhaust from the application chamber and a piston subject on one side to feed valve pressure and on the opposite side to brake pipe pressure and the pressure of a spring for operating said valve.

11. In a fluid pressure brake, the combination with a brake pipe, a feed valve device for maintaining the brake pipe at the standard pressure, and a distributing valve device having an application chamber for controlling the application of the brakes, of a valve for controlling an exhaust from the application chamber, a piston subject to the opposing pressures of the brake pipe and the feed valve device for operating said valve, a main reservoir, and a brake valve device adapted to supply fluid at main reservoir pressure to the feed valve side of said piston for operating said valve to close the exhaust from the application chamber.

In testimony whereof I have hereunto set my hand.

WALTER V. TURNER.